(12) United States Patent
Preau

(10) Patent No.: US 8,912,376 B2
(45) Date of Patent: Dec. 16, 2014

(54) PROCESS FOR UPGRADING A PYROLYSIS OIL, IN PARTICULAR IN A REFINERY

(75) Inventor: Alexandre Preau, Puteaux (FR)

(73) Assignee: Total Raffinage Marketing, Puteaux (FR)

( * ) Notice: Subject to any disclaimer, the term of this patent is extended or adjusted under 35 U.S.C. 154(b) by 139 days.

(21) Appl. No.: 13/391,117

(22) PCT Filed: Aug. 9, 2010

(86) PCT No.: PCT/FR2010/051682
§ 371 (c)(1),
(2), (4) Date: Apr. 26, 2012

(87) PCT Pub. No.: WO2011/020966
PCT Pub. Date: Feb. 24, 2011

(65) Prior Publication Data
US 2012/0203044 A1    Aug. 9, 2012

(30) Foreign Application Priority Data

Aug. 21, 2009  (FR) ..................... 09 55739

(51) Int. Cl.
| | | |
|---|---|---|
| *C07C 1/24* | (2006.01) | |
| *C10G 3/00* | (2006.01) | |
| *C01B 3/38* | (2006.01) | |
| *C01B 3/48* | (2006.01) | |
| *C10G 49/22* | (2006.01) | |
| *C10G 65/04* | (2006.01) | |
| *C10G 65/12* | (2006.01) | |

(52) U.S. Cl.
CPC ... *C10G 3/00* (2013.01); *C01B 3/38* (2013.01); *C01B 3/48* (2013.01); *C10G 49/22* (2013.01); *C10G 65/043* (2013.01); *C10G 65/12* (2013.01); *C10G 3/52* (2013.01); *C01B 2203/0233* (2013.01); *C01B 2203/0283* (2013.01); *C01B 2203/043* (2013.01); *C01B 2203/063* (2013.01); *C01B 2203/142* (2013.01); *Y02E 50/14* (2013.01); *C10G 2300/1014* (2013.01); *C10G 2300/1055* (2013.01); *C10G 2300/1074* (2013.01)
USPC ........... 585/240; 585/242; 585/310; 585/469; 585/638; 585/733; 44/605; 44/606

(58) Field of Classification Search
USPC ................ 585/240, 242, 310, 469, 638, 733
See application file for complete search history.

(56) References Cited

U.S. PATENT DOCUMENTS

| | | |
|---|---|---|
| 5,180,868 A | 1/1993 | Baker et al. |
| 7,425,657 B1 | 9/2008 | Elliott et al. |
| 2008/0053870 A1 | 3/2008 | Marker et al. |

FOREIGN PATENT DOCUMENTS

WO    WO 2007/033460 A1    3/2007

OTHER PUBLICATIONS

International Search Report for PCT/FR2010/051682 dated Jan. 20, 2011.

*Primary Examiner* — Brian McCaig
(74) *Attorney, Agent, or Firm* — Sughrue Mion, PLLC

(57) ABSTRACT

The invention relates to a process for upgrading a pyrolysis oil comprising the following steps: —hydrodeoxygenation treatment (10) of the pyrolysis oil (12) and separation of the effluent (16) obtained into a light aqueous fraction (18) and a heavy organic fraction (20), or separation of the pyrolysis oil into an aqueous fraction and a lignin-rich fraction, —pre-reforming (22) of said aqueous fraction (18) and treatment of the effluent (26) obtained in an SMR unit (28) in order to produce hydrogen (34), —hydrotreatment (40) and/or catalytic cracking and/or visbreaking of said heavy organic fraction (20).

9 Claims, 1 Drawing Sheet

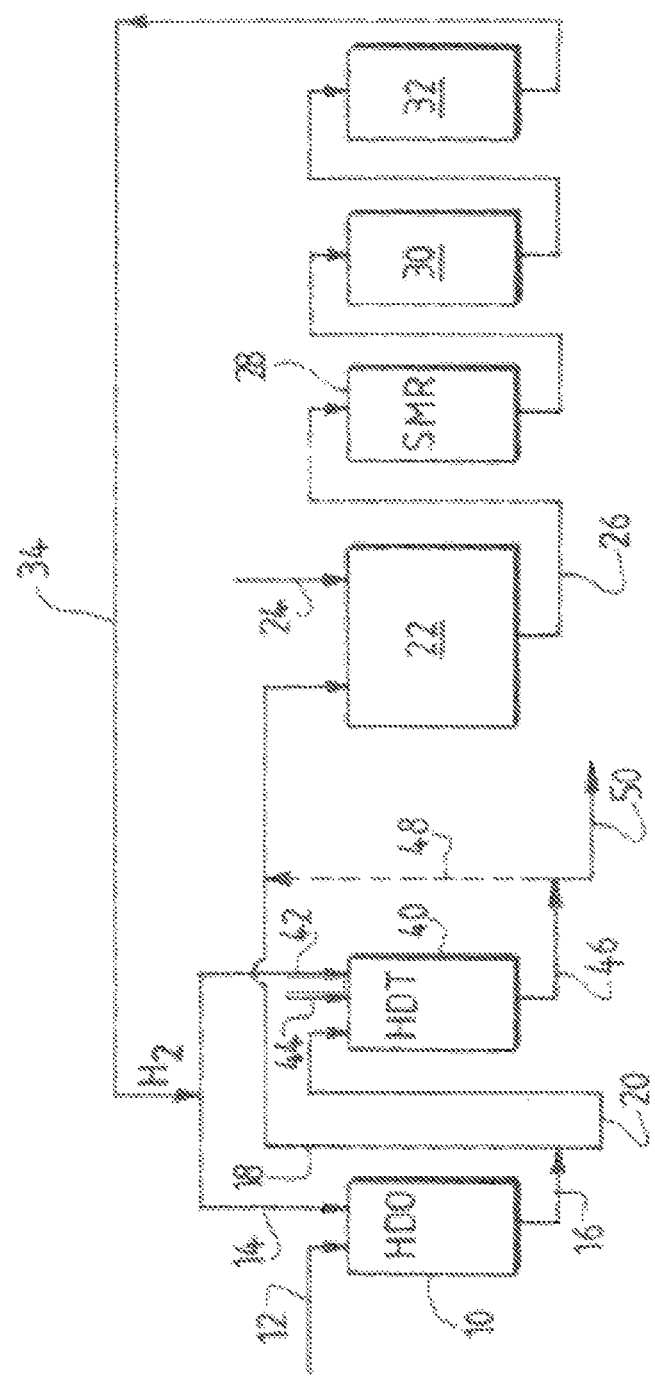

PROCESS FOR UPGRADING A PYROLYSIS OIL, IN PARTICULAR IN A REFINERY

CROSS REFERENCE TO RELATED APPLICATIONS

This application is a 371 National Stage of International Application No. PCT/FR2010/051682 filed Aug. 9, 2010, claiming priority based on French Patent Application No. 09 55739 filed Aug. 21, 2009, the contents of all of which are incorporated herein by reference in their entirety.

The invention relates to a process for upgrading a pyrolysis oil, in particular in a refinery.

Pyrolysis oils, or bio-oils, result from the pyrolysis liquefaction, also known as low temperature fast pyrolysis, of biomass of the following types: wood (deciduous, coniferous), straw and forestry or agricultural biomass waste, such as bark, shavings, sawdust, bagasses, and the like.

These oils are produced by depolymerization and fragmentation of the constituent components of biomass (holocelluloses (cellulose, hemicellulose), lignin) under the action of a rapid increase (<2 seconds) of the temperature to 450° C.-550° C. and of a rapid quenching of the intermediate decomposition products.

They can be regarded as microemulsions in which the continuous liquid phase is an aqueous solution of the decomposition products of cellulose and hemicellulose and small lignin molecules. The continuous liquid phase stabilizes the noncontinuous organic phase composed essentially of macromolecules of the pyrolytic lignin.

They are composed of water and of a complex mixture of oxygen-comprising compounds. Their elemental composition is similar to the composition of the starting biomass with in particular a high oxygen content.

The analyzable mean organic molecular composition can be described by the families presented in table 1.

TABLE 1

|  | Content (% w/w) |
|---|---|
| Pyrolytic lignin | 15-25 |
| Organic acids | 5-15 |
| Aldehydes and hydroxyaldehydes | 5-20 |
| Ketones and hydroxyketones | 0-15 |
| Phenols | 15-35 |
| Methanol, Ethanol | 1-5 |

The main characteristics of pyrolysis oils are combined in the following table 2

TABLE 2

| Properties | Pyrolysis oils |
|---|---|
| pH | 2.0-3.7 |
| Water content (% w/w) | 15-35 |
| Density at 15° C. (kg/m$^3$) | 1110-1300 |
| Viscosity at 20° C. (mm$^2$/s) | 50-130 |
| Viscosity at 40° C. (mm$^2$/s) | 12-35 |
| Elemental analysis   C | 30-50 |
| (% w/w)   H | 6-9 |
|   O | 40-60 |
| Solid materials ( ) | 0.01-2 |
| Ash (% w/w) | 0.01-0.20 |
| Gross Calorific Value GCV (MJ/kg) | 13-19 |
| Metals (K + Na) (mg/kg) | 10-300 |

Pyrolysis oils are characterized by a high density and a viscosity which can vary as a function, inter alia, of the starting biomass. As they are acids and thus corrosive, their use requires the employment of specific corrosion-resistant materials, such as stainless steel, high density polyethylene, propylene, . . . .

Furthermore, pyrolysis oils are unstable chemically and thermally. The chemical instability of pyrolysis oils is reflected by the change over time in their physicochemical properties (viscosity, water content, solids content, . . . ), which can result in separation into two phases. The thermal instability of pyrolysis oils is reflected by a very rapid change in their properties when they are heated to temperatures greater than 80° C. Due to this instability, these products cannot be upgraded in a refinery in their crude form, except in a combustion application with a few modifications to current plants. For any other application in a refinery, it appears necessary to stabilize pyrolysis oils before use, for example by removing or converting the most reactive entities.

Pyrolysis oils exhibit a mean water content of 25% w/w, an oxygen content of the organic fraction of the order 35-40% w/w and a molecular structure of great complexity. The water content may in addition result in a partial phase separation, having an effect on their other physical properties. Finally, their ash and alkali metals contents may result in the formation of deposits and in the fouling of the plants.

Furthermore, due to their hydrophilic nature and their polarity, fast pyrolysis oils are immiscible with hydrocarbons. Thus, pyrolysis oils cannot be upgraded as such in a refinery as a mixture with hydrocarbon fractions of fossil origin.

Thus, due to their specific properties, the use of pyrolysis oils raises numerous problems.

Currently, the main upgrading routes studied are the combustion of the pyrolysis oil in boilers or gas turbines in order to produce heat and/or electricity, or the production of bases for chemistry.

In order to be able to be used in refineries for the purpose of the production of fuel, pyrolysis oils have to undergo a pretreatment targeted at stabilizing them. Such a pretreatment can be a deoxygenation stage which can be:
- total, in order to convert the bio-oils into fuel bases,
- partial (>90%), in order to render the oils miscible with hydrocarbon fractions of petroleum origin, and thus to introduce it into the refining scheme,
- partial (>50%), in order to stabilize the oils for the purpose of subsequent use.

This deoxygenation can be carried out in particular by hydrodeoxygenation (HDO), according to the simplified reaction:

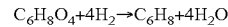

$$C_6H_8O_4 + 4H_2 \rightarrow C_6H_8 + 4H_2O$$

However, the amount of hydrogen necessary is high (from 2 to 7% by weight per weight of pyrolysis oil) and has a major impact on the cost of the treatment of theses pyrolysis oils (approximately ⅓ of the cost price of the fuel bases produced) and on the life cycle analysis (LCA), which is a tool for evaluating the impacts of a system, in this instance the biofuel, on the environment, including all of the activities from the extraction of the starting materials up to the management of the final disposal of the waste. Thus, as regards the biofuel produced from the pyrolysis oil, it is estimated that ⅔ of the total fossil emissions are due to the production of the hydrogen necessary for the hydrodeoxygenation of the pyrolysis oil. In point of fact, an excessively high consumption of hydrogen during the HDO may be totally unacceptable for regarding the fuel bases produced as biofuel according to the criteria of sustainability established by European directives, such as Directive 2009/28/EC, which specifies that, from 2013, the reduction in the emissions of greenhouse gases resulting from the use of biofuels must be at least 35% with respect to fossil fuels. This reduction must be at least 50% from 2017. There thus exists a great need to reduce impact of the consumption of hydrogen during the treatment of pyrolysis oils for the purpose of producing fuel.

One solution might consist in use of the pyrolysis oils themselves to produce hydrogen, for example by catalytic steam reforming.

Studies have shown that the catalytic steam reforming of pyrolysis oil or of pyrolysis oil fractions, carried out under operating conditions similar to those used to produce hydrogen from methane, results in coke formation, leading to rapid deactivation of the catalyst.

Steam reforming in a fixed bed has in particular been studied (Czernik S, French R, Feik C and Chornet E. Hydrogen by catalytic steam reforming of liquid by-products from biomass thermoconversion processes. *Ind Eng Chem. Res.*, 2002 (41), 4209-4215) on an "aqueous" fraction of the pyrolysis oils. Said fraction was obtained by adding water in order to compel phase separation with the pyrolytic lignin fraction. However, coke deposition results in rapid deactivation of the catalyst, limiting the time of the test to a duration (4 hours) which is less than the time necessary for the regeneration of the catalyst (6 to 8 hours), demonstrating the limitations of the fixed bed for reactions of this type. These phenomena are even more marked on using the total oil as steam-reforming feedstock: under the same operating conditions, the maximum duration of a test reaches 45 minutes, whereas the regeneration time for the catalyst is 8 hours.

Following these studies, tests in a fluidized bed were carried out by the same authors. The disadvantage of the fluidized bed is that they have to use catalysts which withstand the attrition phenomena. The performances of the standard catalysts are inadequate and research must be carried out on this subject.

With the same operating conditions as in a fixed bed (850° C., S/C>5, $G_{C_1}$HSV of 800 to 1000 h$^{-1}$) and the same feedstock ("aqueous" fraction obtained by phase separation after addition of water to the pyrolysis oil), the duration of the test under continuous conditions is more than 100 hours.

It is thus apparent that the steam reforming of the aqueous fraction of pyrolysis oil is technically realizable in a fluidized bed and makes it possible to reduce the formation of coke. However, the attrition of the catalyst which is brought about by operation in a fluidized bed requires the development of novel catalysts and of reactors dedicated to this type of treatment. Furthermore, the organic fraction of the pyrolysis oil cannot be upgraded in steam reforming as it comprises compounds which are too heavy for reactions of this type and require another pretreatment in order to be able to be upgradable in a refinery as this fraction is immiscible with hydrocarbons.

The production of hydrogen from pyrolysis oil by a steam reforming process thus can only be envisaged with regard to the aqueous fraction of the oil and does not make possible upgrading of the whole of the oil. As it is possible for said aqueous fraction to still comprise compounds which are precursors of coke following the type of separation used to fractionate the oil, the steam reforming reaction remains difficult to employ.

The invention is targeted at overcoming these disadvantages by providing a process for the upgrading of pyrolysis oils which makes it possible to produce hydrogen while upgrading the whole of the pyrolysis oils treated.

To this end, the subject matter of the invention is a process for the upgrading of pyrolysis oil comprising the following stages:
  prereforming the light aqueous fraction,
  either resulting from the separation of the pyrolysis oil into an aqueous fraction and a lignin-rich fraction,
  or obtained after a hydrodeoxygenation treatment of the pyrolysis oil, followed by separation of the effluent stream obtained into a light aqueous fraction and a heavy organic fraction,
    treatment of said prereformed aqueous fraction in an SMR unit in order to produce hydrogen;
    hydrotreating and/or catalytic cracking and/or viscobreaking of said lignin-rich fraction or of the heavy organic fraction.

The invention relates more particularly to a process for the upgrading of pyrolysis oil comprising the following stages:
  hydrodeoxygenation treatment of the pyrolysis oil and separation of the effluent stream obtained into a light aqueous fraction and a heavy organic fraction,
  prereforming said light aqueous fraction and treatment of the effluent stream obtained in an SMR unit in order to produce hydrogen,
  hydrotreating and/or catalytic cracking and/or viscobreaking of said heavy organic fraction.

The whole of the pyrolysis oil is thus upgraded, making possible the production of hydrogen and of fuel bases of the following types: LPG (liquefied petroleum gas), gasoline, kerosene, gas oil, vacuum gas oil, . . . .

The optional hydrodeoxygenation (referred to as HDO) of the pyrolysis oil and then the prereforming of the aqueous fraction obtained makes it possible to produce hydrogen. The coking problems observed during a direct steam reforming of the pyrolysis oil or of the aqueous fraction of the pyrolysis oil are thus suppressed. This is because the use of the process according to the invention, in particular the process for which the 1st stage is a pyrolysis oil hydrodeoxygenation treatment, results in the formation of an "aqueous" phase, the composition of which is such that the subsequent prereforming stage does not result in the formation of coke. The composition of this aqueous phase is thus completely different from that of the aqueous phase touched on above, in the state of the art and obtained by phase separation after addition of water to the pyrolysis oil.

The aqueous phase obtained after HDO of the pyrolysis oil generally comprises less of heavy products and sulfur (poison for the steam reforming catalyst which is removed in the form of H$_2$S during the HDO) than the aqueous fraction obtained by a phase separation after addition of water to the pyrolysis oil.

The prereforming will make it possible to convert the C$_2$+ compounds into CH$_4$, CO, CO$_2$ and H$_2$ in the presence of a conventional prereforming catalyst, in particular a conventional catalyst for an LPG/naphta prereformer, for example of Ni or NiO type. This reaction can, for example, be carried out in a conventional fixed bed.

The effluent stream exiting from the prereformer is then sent to a conventional SMR (Steam Methane Reforming) unit, steam being added in order to produce H$_2$. This reaction is generally carried out within numerous catalyst-filled tubes positioned in a furnace.

The simplified reactions which occur in the prereformer can be represented schematically by the following equations:

$$C_xH_yO_z + (x-z)H_2O \leftrightarrows (x+y/2-z)H_2 + xCO \quad (1)$$

$$CO + 3H_2 \leftrightarrows CH_4 + H_2O \quad (2)$$

$$CO + H_2O \leftrightarrows CO_2 + H_2 \quad (3)$$

Balance:

$$C_xH_yO_z+(x-y/4-z/2)H_2O \leftrightarrows (x/2+y/8-z/4)CH_4+(x/2-y/8+z/4)CO_2 \quad (4)$$

The reaction occurring in the SMR can be represented schematically by the following equation:

$$CH_4+H_2O \leftrightarrows CO+3H_2.$$

Advantageously, the hydrogen produced from the light aqueous fraction can be used for the hydrodeoxygenation of the pyrolysis oil and/or for the hydrotreating of the heavy organic fraction.

The external contribution of hydrogen necessary for the hydrodeoxygenation (HDO) or hydrotreating (HDT) reactions is thus greatly reduced and may possibly be dispensed with during the operation of the plant, depending on the composition and the amount of aqueous fraction.

For example, with a light aqueous fraction comprising 50% water and 50% organic compounds, the amount of $H_2$ produced is sufficient to cover the $H_2$ requirements of the HDO of the pyrolysis oil. An external contribution of $H_2$ is then only necessary on starting up the plant, before the beginning of production of $H_2$.

The effluent stream obtained during the hydrotreating of the heavy organic fraction can also be separated into a light aqueous fraction and a heavy organic fraction, when the amount of aqueous fraction is sufficiently high to be able to be separated, this light aqueous fraction then being sent to the prereforming with the light aqueous fraction resulting from the hydrodeoxygenation of the pyrolysis oil.

The production of hydrogen can then be increased.

The heavy organic phase resulting from the first HDO may require another hydrotreating (for example HDO) in order to produce fuel bases.

Furthermore, as, contrary to an organic phase obtained by separation by addition of water to pyrolysis oil, this organic phase is miscible with hydrocarbons, it can thus be advantageously cotreated with a fossil feedstock.

Preferably, the organic phase resulting from the HDO of the pyrolysis oil will represent up to 30% by weight of the feedstock of the hydrotreating unit. Advantageously, the cotreatment with the feedstock of fossil origin will take place after a fractionation of the organic phase effluent stream at the outlet of the unit for the hydrodeoxygenation of the pyrolysis oil.

For example, after fractionation, the fraction of the gas oil type resulting from the HDO of the pyrolysis oil can be cotreated in a conventional hydrotreating unit with a feedstock of the gas oil type of fossil origin. The feedstock of the gas oil type of fossil origin can result from the atmospheric distillation of crude oil (gas oil straight run) or from a vacuum distillation of the atmospheric residue (vacuum gas oil) or a feedstock of the gas oil type resulting from a conversion process. The fact of being able to use an existing unit for the second hydrotreating makes it possible to considerably reduce the costs.

Likewise, after a fractionation, the fraction of the kerosene or gasoline type resulting from the HDO of the pyrolysis oil can, if necessary, be cotreated in a conventional hydrotreating unit with a feedstock of the kerosene or gasoline type of fossil origin.

Advantageously, the light aqueous phase resulting from the hydrodeoxygenation of the pyrolysis oil comprises hydrocarbon products comprising at most 6 or 7 carbon atoms, which makes it possible to convert virtually all of the hydrocarbons into methane and $CO_2$ during prereforming, which is carried out at temperatures far below those used for the steam reforming of methane. Thus, coke is not formed during this subsequent stage.

The HDO of the pyrolysis oil can be carried out at a temperature of 150 to 350° C. and a pressure of 100 to 200 bar.

The HDO of the pyrolysis oil can be carried out in one or two reactors in series. In the latter case, the first reactor operates at a temperature of 120 to 180° C., preferably at 150° C., the second operating at a higher temperature of 300 to 400° C., preferably at 350° C.

The hydrodeoxygenation of the pyrolysis oil is carried out under a pressure of 100 to 200 bar. The use of high pressures makes it possible to promote the HDO reaction and to prevent as much as possible the formation of coke on the hydrotreating catalyst and also to reduce the rate of the reactions for the polymerization of the pyrolysis oil with respect to the HDO reactions.

The prereforming can be carried out at a temperature of 225 to 450° C., under a pressure of 1 to 30 bar (the use of high pressures is unfavorable from a thermodynamic viewpoint but makes it possible to reduce the volume of the reactors and thus to limit the capital cost). The temperature range under consideration makes it possible to occupy a favorable thermodynamic range and to prevent the reactions which result in the formation of coke. The reactor under consideration can be of the fluidized bed or fixed bed type, preferably of fixed bed type.

The prereforming will preferably be carried out with a high water/HC feedstock molar ratio of 10 to 15. This ratio is higher than that required by the thermodynamics of the reaction (approximately 3 to 4). For this reason, it makes it possible simultaneously to shift the equilibrium of the reaction towards the production of methane and hydrogen and also to limit the formation of coke. Thus, depending on the water/organics ratio of the light aqueous fraction arriving as feedstock of the prereformer, water will be added in order to obtain a water/oxygen atom comprising compound ratio which will be preferably in the vicinity of 13.

The steam reforming (SMR unit 28) can be carried out at a temperature of 600-900° C. under a pressure of 1 to 30 bar (use of high pressures is generally unfavorable from a thermodynamic viewpoint but makes it possible to reduce the volume of the reactors and thus to limit the capital costs). The steam reforming will preferably be carried out with a water/HC feedstock molar ratio of 3 to 4. Typically, the steam reforming can be carried out in many small tubes (several hundred) filled with catalysts.

It will also be possible to provide a stage of catalytic conversion of the residual CO, optionally followed by a stage of purification of the hydrogen, after the stage of treatment of the effluent stream in the SMR unit.

The stage of catalytic conversion of the residual CO is obtained by shifting (water gas shift) the following equilibrium in favor of the formation of $CO_2$:

$$CO+H_2O=CO_2+H_2.$$

This shifting is favorable at low temperature and with a high water/C ratio.

The purification of the hydrogen is, for example, carried out by the PSA (Pressure Swing Absorber) process based on the absorption of the impurities on molecular sieves.

The invention is now described with reference to the appended drawing and to the nonlimiting examples.

The single FIGURE represents a diagram of a plant which makes possible the implementation of the process according to the invention.

The plant comprises a hydrodeoxygenation (HDO) unit 10. This HDO unit 10 is fed with feedstock to be treated 12, the pyrolysis oil, and with hydrogen 14.

The effluent stream 16 exiting from the HDO unit 10 is separated into a light aqueous fraction 18 and a heavy organic fraction 20.

The light aqueous fraction 18 is subsequently introduced as feedstock of a prereformer 22 which is fed with steam 24.

The effluent stream 26 exiting from the prereformer 22 is subsequently sent to an SMR unit 28 in order to produce hydrogen.

The residual CO present in the hydrogen can be converted in a water gas shift unit 30 and then the hydrogen can be purified in a PSA unit 32, in order to obtain purified hydrogen 34.

For its part, the heavy organic fraction 20 is sent as feedstock of a hydrotreating (HDT) unit 40.

It is possible to provide for the fractionation of this heavy organic fraction 20 before it is sent to the HDT unit 40, one of the fractions obtained, for example the gas oil fraction, being sent to the HDT.

This HDT unit 40 is fed with $H_2$ 42 and optionally with feedstock of the gas oil type 44 which can result from an atmospheric distillation of a crude oil (gas oil straight run) or from a vacuum distillation of the atmospheric residue (vacuum gas oil) or a feedstock of the gas oil type resulting from a conversion process. The effluent stream 46 obtained at the outlet of the HDT 40 can be used as fuel bases of the following types: LPG (liquefied petroleum gas), gasoline, kerosene, gas oil, vacuum gas oil, . . . .

The effluent stream 46 may also exist in the form of two phases, including a light aqueous fraction 48 and a heavy organic fraction 50. The light aqueous fraction 48 can then be sent as feedstock of the prereformer 22, according to requirements. The heavy organic fraction 50 for its part is used as fuel.

The hydrogen obtained 34 can then be used in a refinery but will preferably be used to feed the HDO unit 10 and/or the HDT unit 40.

The process according to the invention thus exhibits the advantage of being able to be employed in an existing plant to which only an HDO unit and prereformer would have been added. This is because the units 28 (SMR), 30 and 32 (PSA) may form part of an existing plant for the production of $H_2$ while the HDT unit forms part of a conventional refinery scheme.

EXAMPLE

A plant as described with reference to the single FIGURE is considered. The HDO unit 10, the prereformer 22 and the SMR unit 28 operate under the following conditions:
HDO:
Temperature: 150-350° C.
Pressure: 150 bar
Prereformer:
Inlet temperature: 250-450° C.
Pressure: 30 bar
GHSV: 1000 h$^{-1}$
S/C (molar): 13
Steam Reforming:
Inlet temperature in the tube: 580-620° C.
Outlet temperature in the tube: 850-870° C.
Pressure: 30 bar
S/C (molar): 3 to 4

The characteristics of the pyrolysis oil used are presented in Table 3 below.

TABLE 3

| Ex-wood (coniferous) pyrolysis oil | |
|---|---|
| Water content (% w/w) | 21.7 |
| Solids content (% w/w) | 0.17 |
| Kinetic viscosity at 50° C. (cSt) | 17.1 |
| Ash content (% w/w) | 0.015 |
| Conradson carbon (% w/w) | 19.9 |
| Density (kg/m$^3$) | 1227 |
| GCV (MJ/kg) | 18.2 |
| Carbon content (% w/w) | 46.1 |
| Hydrogen content (% w/w) | 7.4 |
| Oxygen content (% w/w) | 46.5 |

The flow rate of the pyrolysis oil feedstock at the inlet is 307 kT/year. With this pyrolysis oil of biomass of wood type, comprising 25% (weight) of water and 75% (weight) of organic compounds and under these conditions, the flow rates by weight observed as organic fraction and aqueous fraction at the outlet of the HDO are as follows:
138 kT/year of heavy organic fraction, i.e. a yield by weight of approximately 45%,
169 kT/year of light aqueous fraction, i.e. a yield by weight of approximately 55%.

The composition of the light aqueous fraction is approximately 50% water and approximately 50% organic products, while the composition of the heavy organic fraction is approximately 1% water and 99% organic products (% by weight).

The effluent stream exiting from the HDT results in 115 kT/year of fuel bases, i.e. 83.3% yield by weight, and 23 kT/year of a light aqueous fraction, i.e. 16.7% yield by weight.

The yield by weight of hydrogen exiting from the PSA unit per weight of pyrolysis oil treated is approximately 16%. This hydrogen thus results from the treatment by prereforming of a feedstock of 192 kT/year of a light aqueous fraction obtained by the two hydrodeoxygenation and hydrotreating stages. As the consumption of hydrogen by the HDO and the HDT is approximately 5% by weight per weight of feedstock entering HDO and HDT, the process employed according to the invention is self sufficient in hydrogen and thus does not require an external contribution of hydrogen.

The invention claimed is:

1. A process for the upgrading of pyrolysis oil comprising the following stages:
  prereforming a light aqueous fraction obtained after a hydrodeoxygenation treatment of the pyrolysis oil, followed by separation of an effluent stream obtained therefrom into a light aqueous fraction and a heavy organic fraction, wherein the hydrodeoxygenation of the pyrolysis oil is carried out in two reactors in series, the first operating at a temperature of 120 to 180° C., and the second operating at a higher temperature of 300 to 400° C., wherein the prereforming is carried out at a temperature of 225 to 450° C., under a pressure of 1 to 30 bar;
  treating the prereformed aqueous fraction in an SMR unit in order to produce hydrogen; and
  hydrotreating and/or catalytic cracking and/or viscobreaking the heavy organic fraction.

2. The upgrading process as claimed in claim 1, in which the hydrogen produced from the light aqueous fraction is used for the hydrotreating and/or catalytic cracking of the heavy organic fraction and/or for the hydrodeoxygenation of the pyrolysis oil.

3. The upgrading process as claimed in claim 1, in which the effluent stream obtained during the hydrotreating of the heavy organic fraction is separated into a light aqueous fraction and a heavy organic fraction, when the amount of aqueous fraction is sufficiently high to be able to be separated, this light aqueous fraction being sent to the prereforming with the light aqueous fraction resulting from the hydrodeoxygenation of the pyrolysis oil.

4. The upgrading process as claimed in claim 1, in which the heavy organic phase resulting from the hydrodeoxygenation of the pyrolysis oil is fractionated before the hydrotreating stage.

5. The upgrading process as claimed in claim 1, in which, during the hydrotreating stage, the heavy organic phase resulting from the hydrodeoxygenation of the pyrolysis oil, or the gas oil fraction resulting from the fractionation of the heavy organic phase resulting from the hydrodeoxygenation of the pyrolysis oil, is cotreated with a feedstock of the gas oil type resulting from an atmospheric distillation of crude oil (gas oil straight run) or from a vacuum distillation of the atmospheric residue (vacuum gas oil) or a feedstock of the type consisting of gas oil resulting from a conversion process.

6. The upgrading process as claimed in claim 1, in which the light aqueous phase resulting from the hydrodeoxygenation of the pyrolysis oil comprises hydrocarbon products comprising at most 6 or 7 carbon atoms.

7. The upgrading process as claimed in claim 1, in which the hydrodeoxygenation of the pyrolysis oil is carried out at a temperature of 150 to 350° C. and a pressure of 100 to 200 bar.

8. The upgrading process as claimed in claim 1, in which the prereforming is carried out with a water/HC feedstock molar ratio of 10 to 15.

9. The process as claimed in claim 1, in which a stage of catalytic conversion of residual CO, optionally followed by a stage of purification of the hydrogen, is carried out after the stage of treatment of the effluent stream in the SMR unit.

* * * * *